E. S. MILLER.
STREET CAR FENDER.
APPLICATION FILED DEC. 8, 1910.
997,077. Patented July 4, 1911.
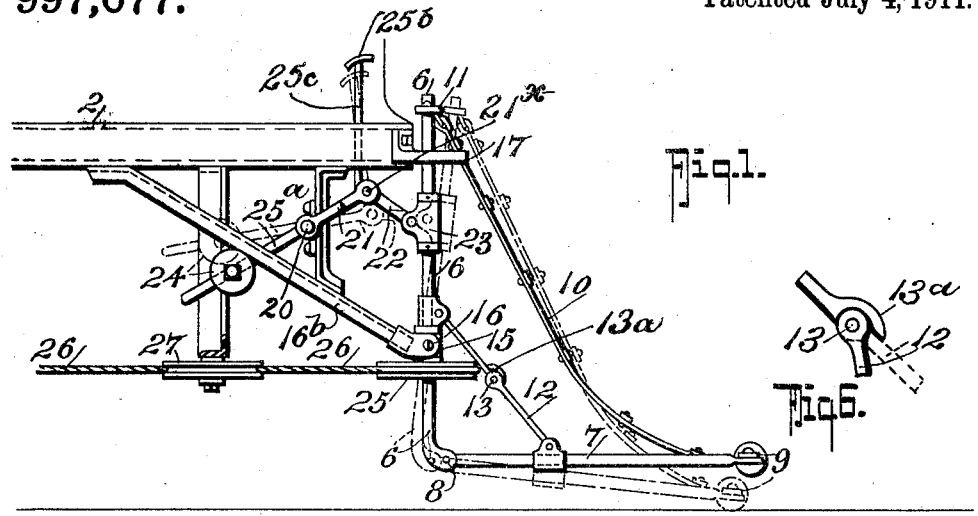
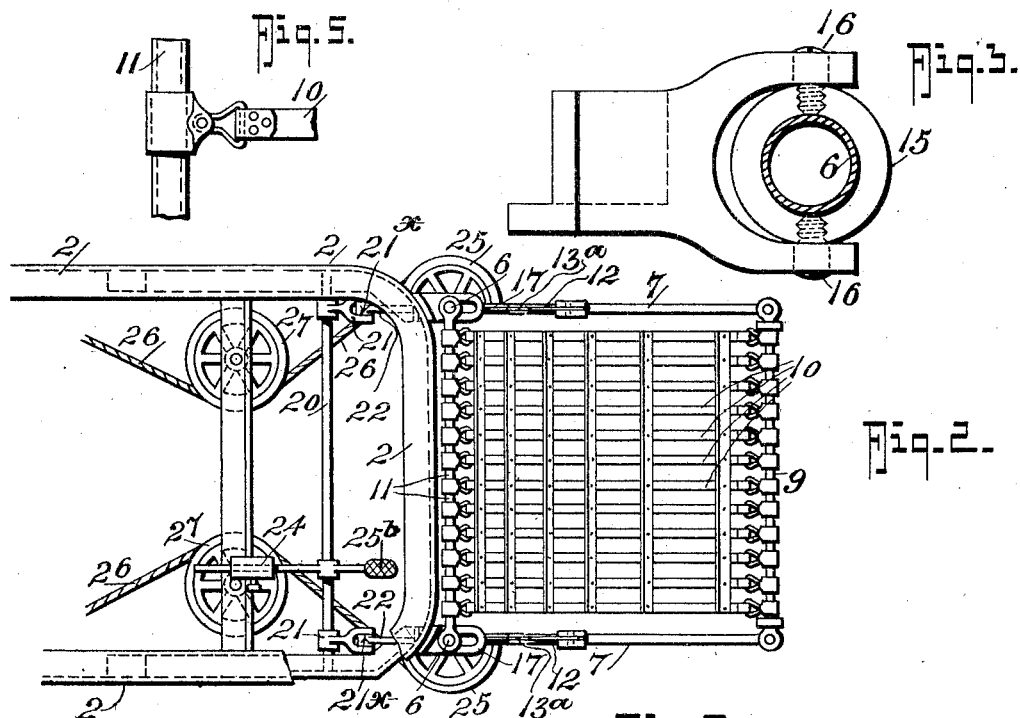
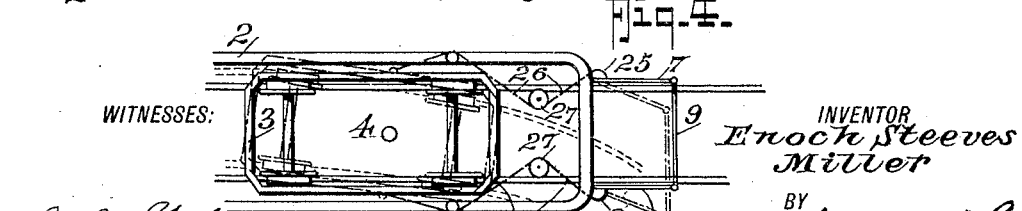

UNITED STATES PATENT OFFICE.

ENOCH STEEVES MILLER, OF NEW WESTMINSTER, BRITISH COLUMBIA, CANADA.

STREET-CAR FENDER.

997,077.        Specification of Letters Patent.       Patented July 4, 1911.

Application filed December 8, 1910. Serial No. 596,278.

*To all whom it may concern:*

Be it known that I, ENOCH S. MILLER, citizen of the Dominion of Canada, residing at New Westminster, in the Province of British Columbia, Canada, have invented a new and useful Street-Car Fender, of which the following is a specification.

This invention relates to a street car fender having provision whereby the fender is laterally movable to follow a curve, the lateral movement being coöperative with the radial movement of the leading truck of the car in adapting itself to the curve.

In street railway cars the overhang of the end of the car beyond the pivotal axes of the trucks on which it is carried is such that when the car takes a curve the end of the car and its fender projects over the outside rail of the curve to such an extent that the fender is no protection against anything falling under the wheels of the car, and the sweep of the front end of the fender is itself a source of danger to pedestrians. Attempts have been made to overcome this objection by laterally moving the fender to follow the curve, but where this has been done the mechanism has either been too complicated and expensive for adoption, or being operative from the front corners of the leading truck, the device has not been mechanically correct, as the backward movement of the corner of the truck adjacent to the inner rail is greater in a fore and aft direction than the forward movement of the corner adjacent to the outer rail. This is owing to the fact that the front corners are in advance of the axis of movement and though they move through the same arc, the components of the movement on lines parallel to the middle line of the car are greater or less according as the movement is toward or from a transverse line through the pivot of movement. Owing to this fact rigid link bars cannot be used to connect the corners of the truck to the means by which the fender is to be laterally moved, and if a flexible connection is used the mechanism to swing the fender must be operated by the connection from the inner side only of the truck and by the connection on the outer side of the truck to bring the fender back. There is unavoidable lost motion before the connection with the fender can act to pull back the fender when the truck enters again upon a straight track.

These objections I overcome by connecting the lateral operating means to positions on the sides of the truck where the ends of a transverse line through the axis of the truck's pivotal center coincide therewith, so that the longitudinal component of the arcs of movement of the points of connection on both sides of the truck are equal.

The invention also comprises a means whereby the front rail of the fender may be lowered by the motorman to the level of the track when approaching an obstruction, which lowering means is also automatically operable by contact of the front rail of the fender with an obstacle, which provision is desirable if the motorman fails to see the obstacle in time to act.

The invention is particularly described in the following specification, reference being made to the drawings by which it is accompanied, in which:

Figure 1 is a perspective view of the fender, Fig. 2, a plan of the same, Fig. 3, an enlarged detail of the pivotal mounting of the fender frame in its supports, Fig. 4, a plan showing the truck and position of the fender when the car is turning a curve, and Fig. 5, an enlarged detail showing the manner of connecting the net straps to the front and back cross rails of the fender. Fig. 6 is an enlarged detail of the hinge joint and the stop 13$^a$ hereinafter referred to.

In these drawings 2 represents the under frame of the car body and 3 the frame of the adjacent truck, 4 being the pivotal axis on which the truck turns.

The fender proper is composed of two side frames each consisting of a vertical member 6 and a horizontal member 7 which members are hinged at their connection at 8 so that the fender may be folded up against the end of the car when not in use.

The front ends of the horizontal members 7 are pin-connected to a front cross rail 9 from which the straps 10, which form the net of the fender, pass to a top cross rail 11 which connects the upper ends of the vertical members 6. The cross rails 9 and 11 are respectively connected to the front ends of the horizontal members 7 and the upper ends of the vertical members 6 in a manner that will permit pivotal movement of the side frames on the axis of the vertical members 6 while these cross rails maintain their parallelism with the front end of the car.

Between the vertical member 6 and the horizontal member 7 is an angular brace or stay 12, which is hinged at 13 and pin-connected to the members 6 and 7, so that while the horizontal member 7 is supported by it when down, it will not interfere with the folding up of the fender when required, but the hinge being provided with a stop 13ª will not fold to permit the front end of the fender to lift on meeting with an obstacle.

The fender frame thus constructed is carried in bearings 15, which are themselves mounted on horizontal trunnion pins 16 provided in the forked end of a stay brace 16ᵇ projected downwardly and forwardly from each side of the under frame of the car, and also on slotted brackets 17 adjacent to the upper ends of the vertical members 6 on each side so that the fender is susceptible of being angled forward on the trunnion pins 16 a sufficient amount to bring the front rail 9 to the track level, the movement being limited by the slot in each of the brackets 17.

As the weight of the fender predominates in front of its pivotal supports 16 it will tend to fall forward to the further limit of this movement, but is retained in its desired normal position with the front rail 9 about six inches from the track by the following means: Extending across the width of the car under frame is a rocking shaft 20 which is connected by levers 21 and links 22 to sleeve-bearings 23 on the vertical members 6 of the fender frame, the connection being such that by the movement of the rocking arm the vertical member may be either tilted forward or drawn back. Each lever 21 is hinged at 21ˣ to its corresponding link 22. The fender frame is normally drawn back by a counterweight 24 on the end of a lever 25ª secured on the rocker shaft and this counterweight lever is produced beyond its attachment to the rocker shaft and has connected to it a rod 25ᶜ which passes through the floor of the car, where it is provided with a pedal 25ᵇ which the motorman may press down and thereby tilt the vertical portion of the fender forwardly and thus depress the front rail to the track level. When he removes his foot from the pedal 25ᵇ the counterweight will lift the fender again to its normal position. When the front rail 9 meets an obstacle it moves back against the resistance of the counterweight which normally holds it in the forward and upward position.

It will be noticed that all the connections of the fender frame to the car are such as will permit of pivotal movement of the upright members 6. This is to enable the front end of the fender to be swung laterally to follow the curve.

Secured on each upright 6 of the fender frame is a grooved segment 25 from which a flexible connection 26 passes around a guide pulley 27 and is attached to the sides of the truck of the car at points which lie in a transverse line with the pivot 4 on which the truck turns. With this connection, as the car takes a curve, the truck first turns itself correspondingly, the inner side of the truck moving backward (with relation to a line drawn transversely through the pivotal center 4 of the truck, and normal to the central vertical longitudinal plane of the car body) and the outer side moving forward as the wheels attempt to place themselves with their axles radial to the curve and the backward movement of the inner side by means of the flexible connection from that side to its segment 25 will rotate the upright to which it is secured and through it the entire connected frame. The ratio of the radius of the segment 25 to the backward movement of the truck frame being so proportioned that the free ends of the fender will be moved laterally to maintain its position over the track rail. It will be obvious that owing to the location of the wire rope connections to the truck on a transverse line through the pivot of movement that as one side is drawn back the other side is moved forward the same amount.

In use the fender is sustained with its front end about six inches clear of the track and on passing over a curve the front bar of the fender will be laterally moved to maintain its position over both rails. If at any time the motorman sees an obstruction on the track he can, by the application of his foot to the pedal 27, lower the front end of the fender to the track level, and it must be noted that this movement is not only downward but also backward which feature is of importance when the front end is lowered automatically by contact of the front rail with the obstruction, as in a case where the motorman either has not seen the obstruction or has not had time to act.

The mechanism of the pedal is exceedingly simple both to manufacture and in its operation and does not interfere with existing mechanisms.

Having now particularly described my invention and the manner of its use, I hereby declare that what I claim as new and desire to be protected in by Letters Patent, is:

1. In a car fender a net carrying frame including vertical side members, means for engaging said vertical side members for pivotally mounting said frame on the front end of the car, means for imparting a rotary movement to said vertical side members, said means comprising, in combination with the pivoted car truck, connections between said side members and the sides of said car truck at points in transverse alinement with the pivotal axis of the car truck.

2. In a car fender, a net-carrying frame the vertical members of which on each side are pivotally mounted on the front end of the car so that the front end of the fender is susceptible of being swung to either side, a wheel segment secured on the vertical side members of the fender and a flexible connection from each of these wheel segments to the side frame of the adjacent car truck the connection being made on a transverse line through the pivot on which the truck turns.

3. In a car fender, a net-supporting frame so connected to the front end of the car that the front end of the fender may be laterally swung to one side or the other by connection to the adjacent truck on which the car is carried, means for supporting the fender with its front rail clear of the track in a manner that it will yield backwardly and downwardly to the track level on engagement with an obstacle and means for lowering the front rail to the track level by the application of the foot when required.

4. In a car fender, a net-carrying frame the vertical side members of which are provided with supporting bearings which are mounted to turn on a horizontal axis in the front end of the car, means for limiting the forward movement of the vertical side members of the fender frame, means for counterbalancing the normal tendency of the front end of the frame to fall to the track level and means for pressing the front end of the fender to the track level when required.

5. In a car fender, a net-carrying frame composed of vertical and horizontal side members hinged together so that the horizontal member may fold up against the vertical one, the members on each side being connected by horizontal cross rails, means for supporting the fender on the front end of the car in horizontal trunnion bearings at the lower end of the vertical members, a rocking shaft adjacent to the upper ends of the vertical side members of the frame, means for operating the rocking shaft by a pedal from the car platform, a lever and link secured on the rocking shaft adjacent to each vertical side member to which levers the vertical side members are connected in a manner that will permit them to turn in their bearings and a counterweight counterbalancing the weight of the front end of the fender.

In testimony whereof I have signed my name to this specification in the presence of two undersigned witnesses.

ENOCH STEEVES MILLER.

Witnesses:
   THOS. A. MACINNES,
   ROWLAND BRITTAIN.

---

Copies of this patent may be obtained for five cents each, by addressing the "Commissioner of Patents, Washington, D. C."